United States Patent Office 3,425,089
Patented Feb. 4, 1969

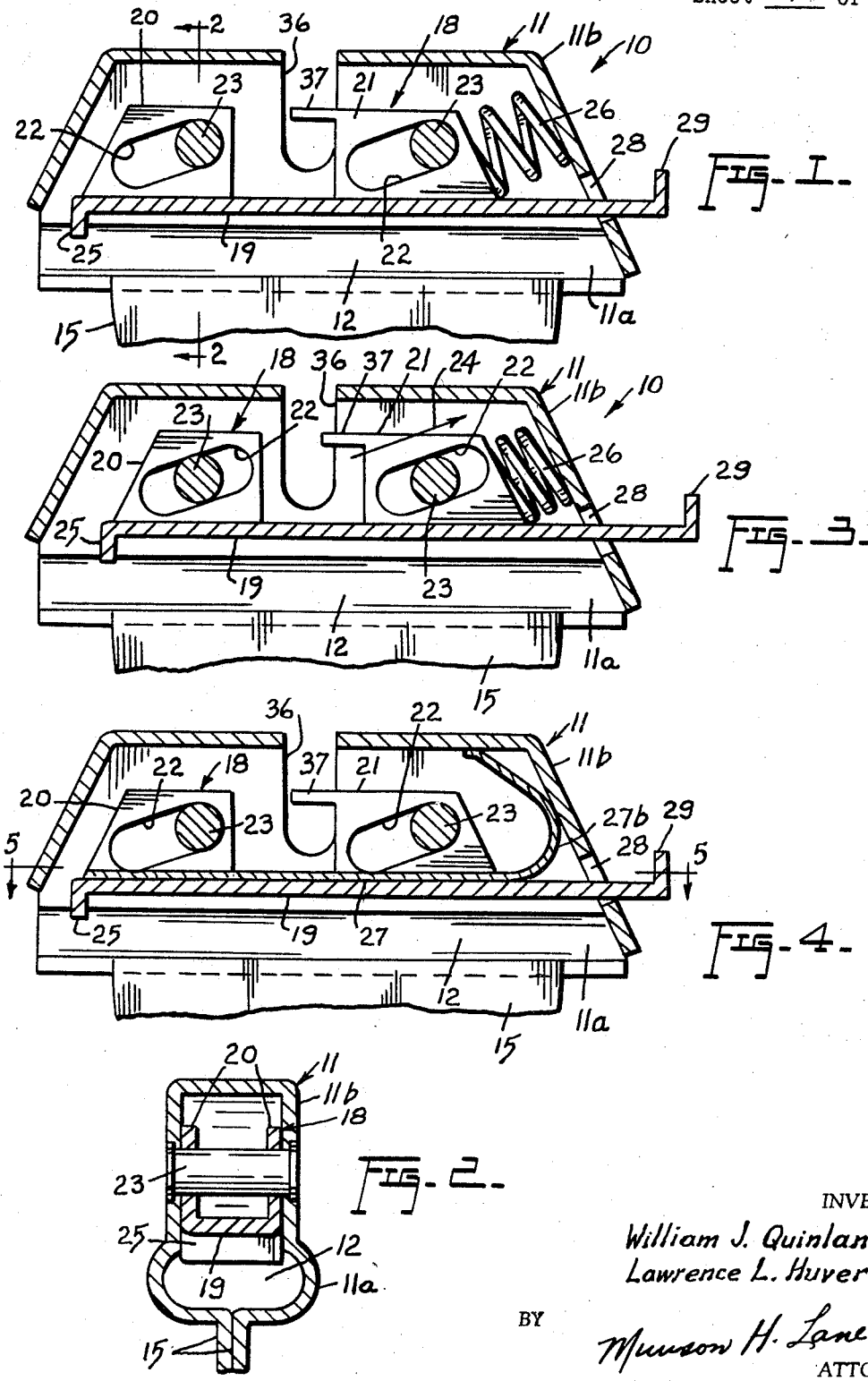

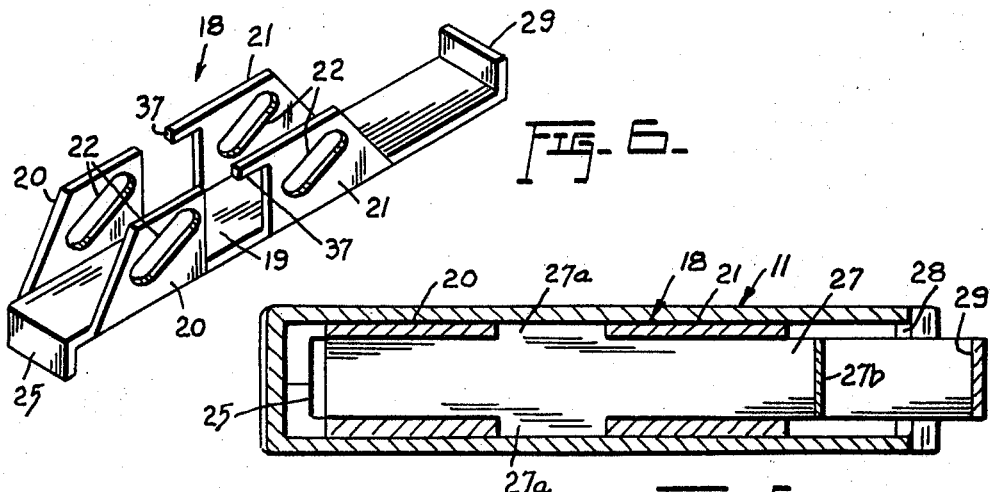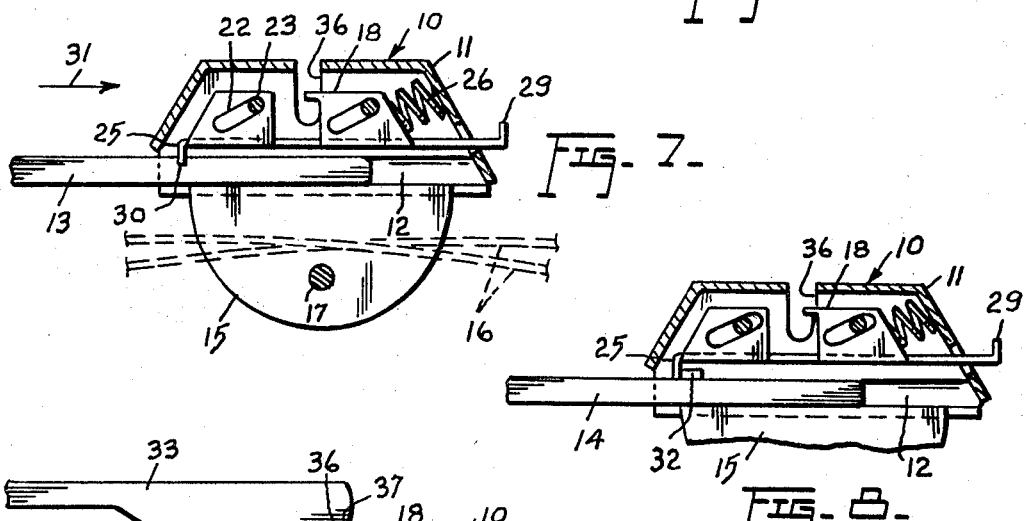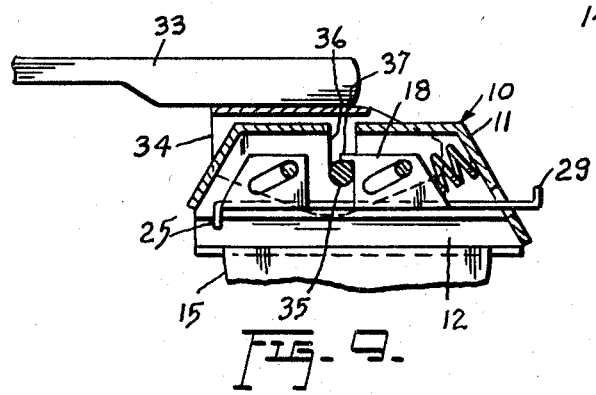

3,425,089
ARM AND BLADE CONNECTOR FOR WINDSHIELD WIPERS
William J. Quinlan and Lawrence L. Huver, Hastings, Mich., assignors to Hastings Manufacturing Company, Hastings, Mich., a corporation of Michigan
Filed June 22, 1967, Ser. No. 648,079
U.S. Cl. 15—250.32      16 Claims
Int. Cl. B60s 1/04; A47l 1/02

ABSTRACT OF THE DISCLOSURE

A connector for removably attaching a wiper blade to an arm, the connector consisting of a blade-mounted case which contains a slide provided with detents to lockingly engage the wiper arm. The slide has oblique cam edges in engagement with cross pins in the case and a spring biases the slide in a direction in which the cam action brings the detents into locking engagement with the arm. The case is provided with different sockets for different types of arms, but the slide and detents are operative regardless in which socket an arm is positioned. A finger-piece projects from the slide to the outside of the case for retracting the slide against its spring bias to disengage the connector from the arm.

---

This invention relates to new and useful improvements in windshield wipers, and in particular the invention concerns itself with an improved connector assembly for removably attaching a wiper blade to a wiper arm.

The principal object of the invention is to provide an arm and blade connector which is simple in construction in that it consists of a minimum number of parts which can be easily and economically manufactured, and which may be quickly and easily installed or removed by service station personnel.

Another important object of the invention is to provide a connector which is capable of accommodating a variety of different types of wiper arms, without involving any modification of the structure of the connector itself.

Another important object of the invention is to provide a connector embodying a sliding cam action which tends to increase the locking of the connector to the wiper arm under any tendency of them to become separated.

Another important object of the invention is to provide a connector which affords adequate bearing surfaces between the connector case and any one of different arms to which it may be attached, while still providing pivotal movement necessary for proper contact of the wiper blade with the windshield.

With the foregoing more important objects in view and such other objects and features as may become apparent as this specification proceeds, the invention will be understood from the following description taken in conjunction with the accompanying drawings, wherein like characters of reference are used to designate like parts and wherein:

FIGURE 1 is a fragmentary, vertical longitudinal sectional view showing one embodiment of the connector of the invention;

FIGURE 2 is a fragmentary cross-sectional view, taken substantially in the plane of the line 2—2 in FIG. 1;

FIGURE 3 is a view, similar to that in FIG. 1, but showing the slide in the process of being retracted;

FIGURE 4 is a view, similar to that in FIG. 1, but showing a modified embodiment of the connector;

FIGURE 5 is a sectional view, taken substantially in the plane of the line 5—5 in FIG. 4;

FIGURE 6 is a perspective view of the slide used in both the embodiments of FIG. 1 and FIG. 4; and FIGURES 7, 8 and 9 are fragmentary views on a reduced scale, showing the connector in association with three different types of wiper arms.

Referring now to the accompanying drawings in detail, more particularly to FIGS. 1–3 and 6, one embodiment of the windshield wiper arm and blade connector is designated generally by the reference numeral 10. The same comprises a case 11 which may conveniently be formed in one piece from metal, the case being elongated and having what may be generally designated as a lower portion 11a and an upper portion 11b. As is best shown in FIG. 2, the lower portion 11a of the case is bulged laterally outwardly and defines an elongated socket 12 for slidable reception of the outer end portion of certain types of wiper arms, for example an arm 13 or an arm 14, as will be hereinafter described in connection with FIGS. 7–9. Below the socket 12 the lower portion 11a of the case is provided with a pair of juxtaposed ears 15 for attachment of the connector to the usual support members 16 of a wiper blade, as for example by a pivot pin or rivet 17 shown in FIG. 7.

The upper portion 11b of the case 11 contains a slide 18 which is shown by itself in FIG. 6. The slide 18 is elongated and, for most part, of a U-shaped cross-section, including a strip-like base member 19 provided at its opposite sides with longitudinally spaced pairs of upstanding flanges 20, 21, these flanges being formed with transversely aligned slots 22 disposed obliquely as shown so as to provide cam edges for engagement with a pair of cross pins 23 extending through the upper portion 11b of the case. Since the pins 23 pass through the slots 22, they serve to retain the slide 18 in position, but the slots are sufficiently long relative to the diameter of the pins, so that the slide may be moved or translated in an oblique direction indicated by the arrow 24 in FIG. 3, as guided by engagement of the cam edges of the slots 22 with the pins 23.

The end of the base member 19 of the slide 18 adjacent the flanges 20 is provided with a downturned detent 25 which is projectable toward or into the arm receiving socket 12 when the slide is moved in a direction opposite to that of the arrow 24, such movement being attained by the biasing action of a compression spring 26 which is interposed between the case portion 11b and the adjacent end edges of the flanges 21, as will be clearly apparent. Alternatively, as shown in FIGS. 4 and 5, the slide may be biased by a leaf spring 27 which is superposed on the base member 19 and has a widened intermediate portion projecting laterally into the space between the flanges 20, 21 as shown in FIG. 5, at 27a, so that the leaf spring is prevented from shifting longitudinally relative to the slide. The spring 27 also has an upwardly curved free end portion 27b to engage the case 11 as shown in FIG. 4, so that the spring 27 is capable of exerting the same biasing effect on the slide 18 in FIG. 4 as does the compression spring 26 in FIG. 1. Apart from the difference between the springs 26 and 27, the embodiments of FIG. 1 and FIG. 4 are identical in both structure and operation.

It will be observed that the base member 19 of the slide 18 is extended beyond the flanges 21 to project outwardly through an opening 28 in the case 11 and provide a finger-piece 29, whereby the slide may be manually retracted in the direction of the arrow 24 against the bias of the spring 26 or 27, as the case may be.

Reference is now drawn to FIG. 7 which shows the connector 10 applied to one particular type of wiper arm 13, the latter being commercially identified as a "Hastings" arm and having its outer end portion formed with a keeper notch 30. When using the connector with this type of arm, the arm 13 is simply inserted into the socket 12 of the connector case, while the finger-piece 29 is pulled outwardly to some extent, sufficient to retract the slide 18 so that the detent 25 does not interfere with insertion of the arm into the socket. Outward pulling of the finger-piece may then be discontinued and while the detent 25 rides along the arm, insertion of the arm in the socket may be continued until the detent snaps into the keeper notch 30 under the biasing action of the slide by the spring 26 or 27. It is to be particularly noted that engagement of the cam edges of the slots 22 with the pins 23 positively moves the slide and the detent 25 downwardly, so that the detent becomes positively locked in the keeper notch 30 of the arm 13. Moreover, any tendency of the connector becoming separated from the arm would be in the direction of the arrow 31 in FIG. 7, and such a tendency would only increase the cam action between the slots 22 and the pins 23, which in turn would tend to urge the detent 25 into an even more effective locking engagement with the notch 30. In this manner the connector is held firmly assembled to the wiper arm, yet may be removed therefrom by simply pulling the finger-piece 29 to retract the slide and thereby disengage the detent 25 from the notch 30, as will be readily understood.

FIG. 8 shows the connector applied to another, different type of a wiper arm 14, commercially identified as a "Trico" arm. Here the arm 14 is not notched, but is provided on its upper edge with a keeper lug 32, and when the arm is inserted in the socket 12, the detent 25 may be engaged with the keeper lug as illustrated, so as to hold the connector assembled to the arm. Of course, during insertion of the arm into the socket, the finger-piece 29 should be retracted to permit the lug 32 to move past the detent 25 into the locked position of the parts. Inasmuch as the arm 14 is not notched like the arm 13, the slide 18 in its locking position will be somewhat higher, as will be noted from comparison of FIGS. 7 and 8, but the locking engagement of the detent 25 with the lug 32 will still effectively hold the connector in place. FIG. 9 shows the connector applied to still another type of wiper arm 33, commercially known as the "Anco" arm, the outer end of which is provided with an inverted U-shaped attachment member 34 having a transverse mounting pin 35 extending therethrough. In this instance the connector is inserted within the U-shaped member 34 so that it is straddled thereby. The upper portion 11b of the connector casing 11 is provided with the top and side walls thereof with a downwardly and transversely extending recess forming a socket 36, the socket being closed and rounded at its lower end as illustrated. When the connector is inserted in the attachment member 34 of the arm 33 as shown in FIG. 9, the mounting pin 35 (which constitutes a member or component of the arm), is received in the socket 36 of the connector casing and is lockingly retained in position by a pair of detents 37 which project from the flanges 21 of the slide 18 in the direction of the flanges 20, as is best shown in FIG. 6. It will be understood, of course, that prior to application of the connector to the arm member 34, the finger-piece 29 is retracted or pulled outwardly so as to retract the slide 18, thus accordingly retracting the detents 37 from their projected position in the socket 36, so that the pin 35 of the arm 33 may be received in the socket. Upon releasing of the finger-piece 29, the biasing action of the spring 26 or 27 on the slide 18 will again project the detents 37 into the socket 36, above the pin 35, thus holding the connector and the arm 33 in assembled relation.

It may be noted that the particular cam action of the slots 22 and pins 23 which increases the locking effect of the connector to the arm as already described in regard to FIG. 7, is also obtained in the arrangements of FIGS. 8 and 9. Also, it is to be observed that the same connector, equipped with the sockets 12 and 36, may be used without any structural modification to accommodate a variety of different wiper arms, as for example the arms 13, 14 and 33. While in FIGS. 7–9 the connector has been shown as being equipped with the compression spring 26, it will be recognized that comparable results may be obtained by utilizing the leaf spring 27 of FIG. 4, if so preferred.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. The combination of a windshield wiper arm and a connector assembly for removably attaching a wiper blade to said arm, said connector assembly comprising a case adapted to be mounted on a blade and provided with a socket removably receiving a member of said arm, a slide positioned in said case and having detent means lockingly engageable with said arm member, said slide also having cam edges extending obliquely relative to said socket, cross pins provided in said case and engaged by said cam edges, and resilient means in said case biasing said slide in a direction in which engagement of said cam edges with said cross pins causes said detent means to lockingly engage said arm member and retain the latter in said socket.

2. The combination as defined in claim 1 together with a finger-piece provided on said slide and projecting outwardly from said case for retracting the slide against the bias of said resilient means, whereby to disengage said detent means from said arm member and facilitate removal of the latter from said socket.

3. The combination as defined in claim 1 wherein said case is elongated and includes upper and lower portions, said slide also being elongated and disposed longitudinally in the upper portion of the case, said cam edges being constituted by obliquely extending transverse slots provided in the slide, and said cross pins extending through said slots.

4. The combination as defined in claim 3 wherein said slide has a U-shaped cross-section and includes a strap-like base member with side flanges, said side flanges having said slots formed therein and said base member having an extension projecting outwardly from the case to provide a finger-piece for retracting the slide against the bias of said resilient means, whereby to disengage said detent means from the arm member and facilitate removal of the latter from said socket.

5. The combination as defined in claim 3 wherein said arm member receiving socket is elongated and defined by the lower portion of said case, said detent means projecting from said slide downwardly into said socket.

6. The combination as defined in claim 5 wherein said arm member is formed with a notch receiving said detent means.

7. The combination as defined in claim 5 together with a keeper lug provided on said arm member, said detent means engaging said keeper lug.

8. The combination as defined in claim 3 wherein said arm member receiving socket extends downwardly and transversely in the upper portion of said case and wherein the arm member in said socket extends transversely of said slide, said detent means on the slide projecting into said socket above said arm member.

9. The combination as defined in claim 3 wherein said resilient means comprises a compression spring reacting between said slide and said case.

10. The combination as defined in claim 3 wherein said resilient means comprises a leaf spring reacting between said slide and said case.

11. The combination of a windshield wiper arm having a free outer end, and a connector assembly for removably attaching a wiper blade to the outer end portion of said arm, said connnector assembly comprising an elongated case adapted to be mounted on a blade, said case including upper and lower portions and being provided in one of said portions with a socket removably receiving an outer end member of said arm, an elongated slide disposed longitudinally in the upper portion of said case, said slide having detent means overlying and lockingly engaging said arm member when the slide is moved in said case longitudinally inwardly relative to said arm, oblique cam means guiding movement of the slide in the case so that said detent means are raised and retracted from said arm member when the slide is moved longitudinally outwardly relative to the arm to effect detachment of the connector assembly from the arm, and resilient means biasing said slide longitudinally inwardly in said case for locking engagement of said detent means with said arm member, said oblique cam guiding means being operative to assist said resilient means in urging said slide to its arm member locking position under forces tending to displace the connector assembly longitudinally outwardly of said arm.

12. The combination as defined in claim 11 wherein said oblique cam guiding means comprise cam edges provided on said slide, and cross pins provided in said case and engaged by said cam edges, said cam edges extending longitudinally of the slide but obliquely in an outwardly and upwardly slanting direction, whereby the slide is respectively raised and lowered during its respective outward and inward movements in the case, and also whereby the slide is urged downwardly into its locking position by any tendency of the case to move longitudinally outwardly relative to said arm.

13. The combination as defined in claim 12 wherein said arm member receiving socket is elongated and defined by the lower portion of said case, said detent means being provided at the underside of said slide and projecting downwardly into said socket.

14. The combination as defined in claim 13 wherein said arm member is formed with an upwardly open notch receiving said downwardly projecting detent means.

15. The combination as defined in claim 13 together with a keeper lug provided on top of said arm member, said downwardly projecting detent means engaging said keeper lug.

16. The combination as defined in claim 12 wherein said arm member receiving socket extends downwardly and transversely in the upper portion of said case and wherein the arm member in said socket extends transversely of said slide, said detent means being provided on the upper portion of said slide and projecting into said socket above said arm member.

References Cited

UNITED STATES PATENTS

| | | | |
|---|---|---|---|
| 2,432,689 | 12/1947 | Smulski | 15—250.32 |
| 2,965,914 | 12/1960 | Anderson | 15—250.32 |
| 2,965,915 | 12/1960 | Krohm | 15—250.32 |
| 2,679,066 | 5/1954 | Nesson | 15—250.32 |
| 3,144,673 | 8/1964 | Ludwig | 15—250.32 |

PETER FELDMAN, *Primary Examiner.*